May 17, 1955   J. LATZEN   2,708,590
BALL AND SOCKET JOINTS
Filed Aug. 15, 1950

JOSEF LATZEN
INVENTOR.

BY Robert H. Jacob.

AGENT

United States Patent Office 2,708,590
Patented May 17, 1955

2,708,590

BALL AND SOCKET JOINTS

Josef Latzen, Dusseldorf-Oberkassel, Germany, assignor to the firm A. Ehrenreich & Cie., Dusseldorf-Oberkassel, Germany Application August 15, 1950, Serial No. 179,532

5 Claims. (Cl. 287—90)

My invention relates to ball and socket joints for various purposes, especially for guide rods and steering gears, the ball head of the joint rod being supported in the joint housing within dish-shaped bearing surfaces allowing the rod free motion angularly.

The principal object of the present invention is to provide an improved ball and socket joint enabling both ease of manufacture and a reduction of production costs.

The prior art ball and socket joints of the mentioned type require an exact fitting of the ball head into the dish-shaped bearing surfaces as well as an exact fitting of the bearing shell into the housing. These requirements make their production costly.

According to the present invention the middle zone of the ball head taken vertically to the rod axis is enclosed by a cylindrical ring, and the lower bearing shell is so arranged that it has play within the housing, thus obtaining an automatic centering of the lower bearing shell, which is made possible by guiding the ball head by means of the cylindrical ring. Hence, a considerable facilitation of machining the joint is accomplished as it is much easier to fit the cylindrical ring with respect to both the ball head and the housing than it would be to simultaneously observe the tolerance required in fitting the dish-shaped bearing surface to the ball head and the outer surface of the bearing shell to the housing. The production of a ball and socket joint according to this invention requires only the fitting of the cylindrical ring, which can be machined very easily, and observance of limits as to the inner bearing shell surface with respect to the ball head. The presence of play between the lower bearing shell and the housing moreover attains improved lubricating conditions. Further, employing a cylindrical ring results in the lower bearing shell being loaded only by forces acting in the axial direction of the rod.

Other advantages will be apparent from the detailed description.

By way of example, the structural features of the ball and socket joint according to this invention are set forth in the following specification and will be better understood by reference to the accompanying drawings, in which.

Similar reference numerals refer to similar parts throughout the three views shown.

Figure 1:
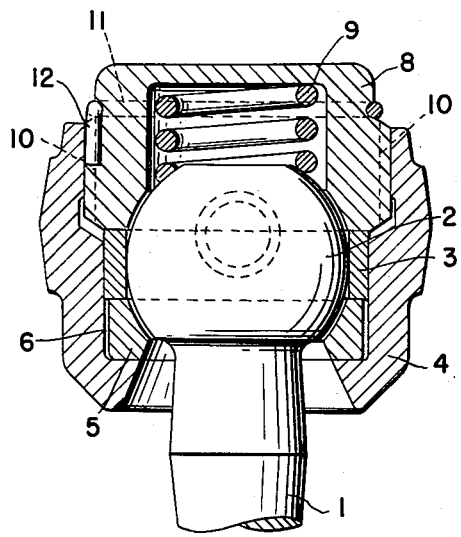
Fig. 1 is a sectional view of one embodiment of the ball and socket joint provided with a lower bearing shell only.

Referring now to the drawings, in Fig. 1 a middle zone of a ball head 2 taken vertically to the axis of a rod 1 is enclosed by a cylindrical ring 3 being supported within a housing 4. The cylindrical ring 3 may have a knurled circumferential rim. A lower bearing shell 5 resting upon the ground within the housing 4 underneath the cylindrical ring 3 is mounted with play within the bore 6 of the housing 4. The assembly is closed by a closure cap 8 which may be threaded to the housing 4 as at 10 and secured by a spring clip 11 having a depending portion 12 arranged to lock the threads 10 by fitting into a hole drilled into the threads. A helical spring 9, inclosed within the closure cap 8, acts upon the head of the ball 2 and urges the lower portion of the ball to seat on the lower bearing shell 5.

Figure 2:
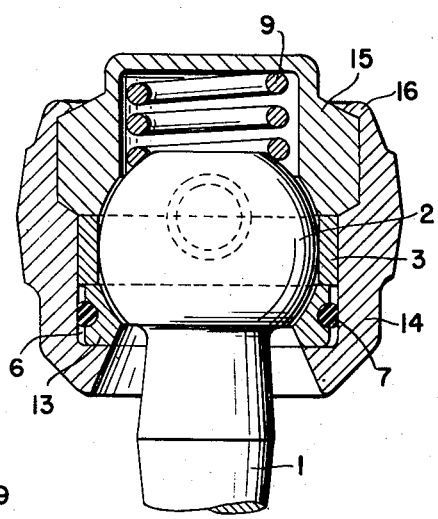
Fig. 2 shows in section a modification of the ball and socket joint of Fig. 1 in which the lower bearing shell is provided with an elastic support; and, Fig. 3 is a sectional view of another embodiment of a ball and socket joint provided with both an upper and a lower bearing shell.

The embodiment illustrated in Fig. 2 shows a spring ring 7 of rubber or other resilient material intermediate the grooved lower bearing shell 13 and the inner wall of the housing 14. A closure cap 15 of the housing 14 is secured in place as by crimping at 16.

Figure 3:
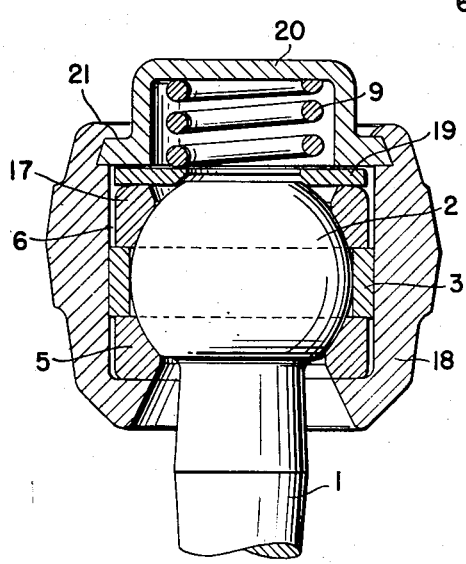

According to Fig. 3 an embodiment of the invention is shown which is provided with an upper bearing shell 17 mounted with play within the bore of the housing 18 and covered by an annular disc 19 loaded by the spring 9 which is enclosed by a closure cap 20, which may be crimped to the housing as at 21.

While several alternate constructions have been illustrated for purposes of disclosure, structural changes and modifications may be made in the disclosed ball and socket joints for various purposes without departing from the spirit and the salient ideas of this invention.

What I claim is:

1. A ball and socket joint comprising a ball headed rod, bearing means around the ball head of said rod, a spring adapted to apply pressure axially of said ball headed rod and a housing enclosing said ball head, said spring and said bearing means, said bearing means comprising at least three members disposed around said ball head and including a central annular member of cylindrical conformation having substantially linear engagement with the central portion of said ball head about the equatorial region thereof, a lower annular member in engagement with said central member having an outer diameter which is smaller than the inner diameter of the adjacent wall of said housing and an inner surface conforming to the ball headed rod, and an upper annular member having a bearing surface conforming to the ball headed rod proximate the upper portion of said ball head and below the lower end of said spring, the arrangement being such that the helical spring urges the ball head to seat on the inner surface of the lower annular member while permitting axial movement of the ball headed rod between the upper and lower annular members and angular movement with respect to the upper, central and lower annular members.

2. A ball and socket joint comprising a ball headed rod, bearing means around the ball head of said rod, a spring adapted to apply pressure axially of said ball headed rod and a housing enclosing said ball head, said spring and said bearing means, said bearing means comprising at least three members disposed around said ball head and including a central annular member of cylindrical conformation having substantially linear engagement with the central portion of said ball head about the equatorial region thereof, a lower annular member in engagement with said central member having support upon the bottom of said housing, an inner surface conforming to the ball headed rod and an outer diameter which is smaller than the inner diameter of the adjacent wall of said housing, and an upper annular member having a bearing surface conforming to the ball headed rod proximate the upper portion of said ball head and below the lower end of said spring, the arrangement being such that the helical spring urges the ball head to seat on the inner surface of the lower annular member while permitting axial move-
ment of the ball headed rod between the upper and lower annular members and angular movement with respect to the upper, central and lower annular members.

3. A ball and socket joint comprising a ball headed rod, bearing means around the ball head of said rod, a spring adapted to apply pressure axially of said ball headed rod and a housing enclosing said ball head, said spring and said bearing means, said bearing means comprising at least three members disposed around said ball head and including a central annular member of cylindrical conformation having substantially linear engagement with the central portion of said ball head about the equatorial region thereof, a lower annular member in engagement with said central member having an outer diameter which is smaller than the inner diameter of the adjacent wall of said housing and an inner surface conforming to the ball headed rod, and an upper annular member having a bearing surface conforming to the ball headed rod proximate the upper portion of said ball head and below the lower end of said spring, said upper member having a portion constituting a closure for said housing and enclosing said spring, and said spring being supported between said upper member and said ball head, the arrangement being such that the helical spring urges the ball head to seat on the inner surface of the lower annular member while permitting axial movement of the ball headed rod between the upper and lower annular members and angular movement with respect to the upper, central and lower annular members.

4. A ball and socket joint comprising a ball headed rod, bearing means around the ball head of said rod, a spring adapted to apply pressure axially of said ball headed rod and a housing enclosing said ball head, said spring and said bearing means, said bearing means comprising at least three members disposed around said ball head and including a central annular member of cylindrical conformation having substantially linear engagement with the central portion of said ball head about the equatorial region thereof, a lower annular member in engagement with said central member having an outer diameter which is smaller than the inner diameter of the adjacent wall of said housing and an inner surface conforming to the ball headed rod, and an upper annular member having a bearing surface conforming to the ball headed rod proximate the upper portion of said ball head and below the lower end of said spring, and a spring ring disposed intermediate said lower annular member and said housing and partly embedded in a groove circumferentially of said lower annular member, the arrangement being such that the helical spring urges the ball head to seat on the inner surface of the lower annular member while permitting axial movement of the ball headed rod between the upper and lower annular members and angular movement with respect to the upper, central and lower annular members.

5. Ball and socket joint particularly for guide rods and steering gears comprising a housing, a rod having a ball head portion, a housing closure cap, a helical spring arranged within said housing with its axis substantially coaxial with the axis of the ball head and rod, said spring being in engagement with the top portion of the ball head, a cylindrical bearing ring fixedly disposed in said housing centrally of said housing and in engagement with the equatorial surface area of said ball head defined by a plane extending through the center of said ball head and substantially perpendicular to the axis of said rod and ball head, and means within said housing providing a seat for the lower portion of said ball head whereby the ball head is supported within the housing by the seat, the bearing ring and the helical spring.

References Cited in the file of this patent
UNITED STATES PATENTS

| | | |
|---|---|---|
| 1,693,840 | Faudi | Dec. 4, 1928 |
| 1,830,062 | Hufferd et al. | Nov. 3, 1931 |
| 2,181,300 | Flumerfelt | Nov. 28, 1939 |
| 2,219,385 | Ernst | Oct. 29, 1940 |
| 2,586,646 | Graham | Feb. 19, 1952 |

FOREIGN PATENTS

| | | |
|---|---|---|
| 306,350 | Great Britain | Feb. 21, 1929 |
| 597,773 | Great Britain | Feb. 3, 1948 |